(12) United States Patent
Hur

(10) Patent No.: US 8,214,260 B2
(45) Date of Patent: Jul. 3, 2012

(54) ON-LINE SALES METHOD AND SYSTEM

(76) Inventor: Min Hur, Seoul (KR)

(*) Notice: Subject to any disclaimer, the term of this patent is extended or adjusted under 35 U.S.C. 154(b) by 0 days.

(21) Appl. No.: 12/562,060

(22) Filed: Sep. 17, 2009

(65) Prior Publication Data

US 2010/0010876 A1   Jan. 14, 2010

Related U.S. Application Data

(63) Continuation of application No. PCT/KR2008/001473, filed on Mar. 17, 2008.

(30) Foreign Application Priority Data

Mar. 20, 2007 (KR) .................. 10-2007-0027249
Oct. 17, 2007 (KR) .................. 10-2007-0104705

(51) Int. Cl.
*G06Q 30/00* (2006.01)
(52) U.S. Cl. ........................................ 705/26.1
(58) Field of Classification Search ............ 705/26.1, 705/26.2, 26.25, 26.3, 26.35, 26.4, 26.41–26.44, 705/26.5, 26.61–26.64, 26.7, 26.8, 26.81, 705/26.82, 26.9, 27.1, 27.2
See application file for complete search history.

(56) References Cited

U.S. PATENT DOCUMENTS

| | | | |
|---|---|---|---|
| 7,753,772 B1* | 7/2010 | Walker et al. ............. | 463/17 |
| 7,881,979 B2* | 2/2011 | Shaer ......................... | 705/26.8 |
| 2002/0065744 A1* | 5/2002 | Collins ...................... | 705/27 |
| 2002/0107074 A1 | 8/2002 | Lee | |
| 2003/0085678 A1 | 5/2003 | Yamada et al. | |
| 2006/0112099 A1* | 5/2006 | Musgrove et al. ......... | 707/7 |

FOREIGN PATENT DOCUMENTS

| | | |
|---|---|---|
| JP | 2001-357168 A | 12/2001 |
| JP | 2002-032514 A | 1/2002 |
| JP | 2002-042233 A | 2/2002 |
| JP | 2002-092350 A | 3/2002 |
| JP | 2003-030368 A | 1/2003 |
| JP | 2003-077063 A | 3/2003 |
| JP | 2003-150097 A | 5/2003 |
| JP | 2003-230163 A | 8/2003 |
| JP | 2005-000433 A | 1/2005 |
| KR | 10-2000-0058283 A | 10/2000 |
| KR | 10-2001-0044689 A | 6/2001 |
| KR | 10-2001-0073317 A | 8/2001 |
| KR | 10-2001-0095426 A | 11/2001 |

(Continued)

OTHER PUBLICATIONS

Anthony Cabot et al. "Internet Sweepstakes, Contests and Games", Bloomberg Law Reports—Intellectual Property, Jul. 2007.*

(Continued)

*Primary Examiner* — Naeem Haq
(74) *Attorney, Agent, or Firm* — Knobbe Martens Olson & Bear, LLP

(57) ABSTRACT

An on-line sales method includes providing a website operated by at least one computer connected to the Internet, receiving a user's submission of an amount for conducting a sales transaction, providing a plurality of items available for the user to select from and to potentially purchase at the submitted amount, and providing a selection option of the user determined based on the submitted amount. The method further includes receiving, on the website, the user's selection of multiple ones among the plurality of items in accordance with the user's selection option, conducting a computerized drawing to draw one out of the multiple items selected by the user. The drawn item has a published price that is equal to or higher than the submitted amount.

19 Claims, 6 Drawing Sheets

FOREIGN PATENT DOCUMENTS

| KR | 10-2003-0021437 A | 3/2003 |
|---|---|---|
| KR | 10-2003-0044180 A | 6/2003 |
| KR | 10-2004-0083290 A | 10/2004 |
| KR | 10-2004-0097737 A | 11/2004 |
| KR | 10-2006-0128769 A | 12/2006 |
| TW | 536677 B | 6/2003 |
| TW | 200636532 A | 10/2006 |

OTHER PUBLICATIONS

Office Acton dated Jul. 6, 2010 for the corresponding Japanese Patent Application No. 2008-074208.

International Search Report Dated Jun. 25, 2008 of Parent Application No. PCT/KR2008/001473, 3 pgs.

Written Opinion Dated Jun. 25, 2008 of Parent Application No. PCT/KR2008/001473, 5 pgs.

Office Action dated Jul. 21, 2011 of corresponding Taiwan Patent Application No. 097109878—9 pages.

Office Action dated Dec. 21, 2010 of corresponding Japanese Patent Application No. 2008-074208—2 pages.

European Search Report dated Oct. 26, 2010 of corresponding European Patent Application No. 08723510.7—6 pages.

* cited by examiner

ON-LINE SALES METHOD AND SYSTEM

CROSS-REFERENCE TO RELATED PATENT APPLICATIONS

This application is a continuation application under 35 U.S.C. §365(c) of International Application No. PCT/KR2008/001473, filed Mar. 17, 2008 designating the United States. International Application No. PCT/KR2008/001473 was published in English as WO2008/114975 A1 on Sep. 25, 2008. This application further claims the benefit of the earlier filing date under 35 U.S.C. §365(b) of Korean Patent Application Nos. 10-2007-0027249 and 10-2007-0104705 filed Mar. 20, 2007 and Oct. 17, 2007, respectively. This application incorporates herein by reference the International Application No. PCT/KR2008/001473 including the International Publication No. WO2008/114975 A1 and the Korean Patent Application Nos. 10-2007-0027249 and 10-2007-0104705 in their entirety.

BACKGROUND

1. Field

The present disclosure relates to on-line sales method and system using a computerized drawing.

2. Discussion of the Related Technology

In general, under a mutual agreement between a seller and a consumer with respect to commercialized values of goods and services, a transaction may be performed using an appropriate exchange means (merchandise or money corresponding to the mutually agreed values). This transaction has been standardized over several thousands of years of human history.

The Internet may designate an imaginary space where merchandise information and information concerning transaction intension, transaction condition, and the like are exchanged, and also the seller and the consumer do not need to be face-to-face. In this regard, an Internet shopping mall may designate an imaginary space where the goods and services are transacted as merchandise. A feature of the Internet shopping mall may be that there are not spatial/temporal restrictions with respect to the merchandise exhibited on the Internet.

Accordingly, at the time of purchasing merchandise, a purchasing behavior such as using a nearby retail shop in spite of a relatively high price of the merchandise may seldom be shown on the Internet. Specifically, as a result of the Internet not having restrictions on a physical space, the most important decision making factor in selecting an identical merchandise may be price, or compensation related to the price such as free gifts or other physical compensations.

In the Internet shopping mall, purchasing and selling transactions may be performed on the assumption that a consumer wholly pays for a charge of the merchandise. Specifically, in general, the consumer may perform a purchasing transaction in a shopping mall where merchandise having a relatively lower price is suggested under identical objective conditions such as an identical merchandise item and identical payment terms. Thus, operators of the Internet shopping mall may suggest a relatively lower price with respect to identical merchandise items and payment terms, or suggest physical compensations such as free gifts and premiums for the purpose of inducing access and purchasing of the consumer.

However, the above-described Internet shopping mall may be managed such that merchandise items are exhibited on the Internet for the purpose of inducing purchasing decision of the consumer, charge payment with respect to the purchased merchandise item is completed, and then the merchandise item is delivered to the consumer.

Accordingly, a scheme for managing the Internet shopping mall has restrictions in that the Internet shopping mall cannot provide merchandise having a value higher than that of the merchandise purchased by the consumer. Also, there is a restriction in that the Internet shopping mall cannot provide other recreational factors other than providing the merchandise purchased by the consumer.

In this regard, there arises an urgent need for a method and system for managing an online shopping mall that provides merchandise items charged by the consumer and also provides recreational factors as well as the merchandise items. The foregoing discussion is to provide general background information, and does not constitute an admission of prior art.

SUMMARY

An aspect of the invention provides an on-line sales method. The method may comprise: providing a website operated by at least one computer connected to the Internet; receiving, on the website, a user's submission of an amount for conducting a sales transaction; providing, on the website, a plurality of items available for the user to select from and to potentially purchase at the submitted amount; providing a selection option of the user determined based on the submitted amount; receiving, on the website, the user's selection of multiple ones among the plurality of items in accordance with the user's selection option; conducting a computerized drawing to draw one out of the multiple items selected by the user, wherein the drawn item has a published price that is equal to or higher than the submitted amount; and processing to check out the drawn item at the submitted amount without regard to the published price of the drawn item.

In the foregoing method, the user's selection option may be to restrict selection of the user. The user's selection option may comprise a count of items to select from the plurality of items provided for selection, wherein the higher the submitted amount, the higher the count of items to select from. The user's selection option may be determined such that the larger the submitted amount, the more expensive items the user can select from the plurality of items provided for selection. Each of the plurality of items may be pre-classified at one of a plurality of ranks, wherein the user's selection option is determined such that the larger the submitted amount, the more items at higher ranks the user can select from the plurality of items provided for selection.

Still in the foregoing method, the plurality of items may be presented in two or more groups of items, wherein the user may be allowed to select one of the two or more groups, and to further select the multiple items within the selected group. The plurality of items may be presented in two or more groups of items, wherein the user's selection option may comprise a restriction to at least one of the two or more groups for selection. The plurality of items may be presented in two or more groups of items, wherein given the submitted amount, the user's selection option varies in different groups. The plurality of items may be presented in two or more groups of items, wherein the user's selection option comprises a first number of items to select in a first group whereas the user's selection option comprises a second number of items to select in a second group, wherein the first number may differ from the second number.

Further in the foregoing method, the website may publish prices of the plurality of items provided for selection. The user's submission of an amount may comprise choosing one of a plurality of amounts that are proposed by the website. The method may further comprise: receiving a prepayment of money from the user that is to be used to pay for the submitted amount. The method may further comprise: receiving electronic payment of money from the user that is to be used to pay for the submitted amount. All or part of the prices of the plurality of items may be equal to or higher than the submitted amount. The computerized drawing may use a predetermined drawing algorithm, which assigns a probability value to each of the multiple items selected from the user. The probability value of an item may be assigned based on at least loyalty of the user to the website. The drawn item may be selected from the group consisting of a single product, a bundle of products and a service.

Another aspect of the invention provides a method of purchasing an item from an on-line store. The method may comprise: submitting, on a website, a user's willing amount for conducting a purchase transaction; viewing, on the website, a plurality of items available for the user to select from in accordance with a selection option determined based on the submitted amount; selecting, among the plurality of items, multiple ones in accordance with the selection option, for a computerized drawing of one out of the selected items; receiving a result of the computerized drawing, the result comprising identification of an item drawn in the computerized drawing, wherein the drawn item has a published price that is equal to or higher than the submitted amount; and processing to check out the drawn item at the submitted amount without regard to the published price of the drawn item. In the foregoing method, the selection option may be configured to restrict selection of the user. The plurality of items may be presented in two or more groups of items, wherein the user's selection option may comprise a restriction to at least one of the two or more groups for selection.

An aspect of the present invention provides a method and system for managing an online shopping mall of a lottery type, which may provide, to a user, merchandise worth at least a charged amount to be deposited by the user by conducting a lottery.

An aspect of the present invention provides a method and system for managing an online shopping mall of a lottery type, which may allow the merchandise corresponding to at least the charge to be won through a lottery on the basis of the smallest expected value, thereby preventing the user from being defrauded, and further preventing the gambling spirit of the user from being incited.

An aspect of the present invention provides a method and system for managing an online shopping mall of a lottery type, which may register the merchandise won through the lottery in an inventory of the user, thereby making the user experience the fun acquired by collecting the won merchandise in one's own inventory.

An aspect of the present invention provides a method and system for managing an online shopping mall of a lottery type, which may conduct a lottery based on a merchandise list where merchandise desired by the user is recorded, thereby increasing a winning probability in which the merchandise desired by the user is won through the lottery.

An aspect of the present invention provides a method and system for managing an online shopping mall of a lottery type, which may set a winning probability for merchandise having a relatively higher rank to be high, based on the purchasing information or the lottery cycle, thereby providing a larger benefit to select customers.

An aspect of the present invention provides a method and system for managing an online shopping mall of a lottery type, in which when merchandise having an identical rank is registered by a predetermined number in the inventory, the user is given a lottery opportunity for merchandise having a rank higher than the identical rank, thereby inducing the user to collect a larger number of merchandise items in the inventory.

According to an aspect of the present invention, there is provided a method for managing an online shopping mall of a lottery type, the method including: settling a charge deposited by a user; receiving, from the user based on a merchandise information database, a selection of merchandise information worth at least the charge, and recording the received selection in a merchandise list; lotting the merchandise information using the merchandise list; and registering the lotted merchandise information in an inventory of the user.

In this instance, the receiving of the selection of merchandise information may include receiving, from the user, a selection of merchandise information on a number of merchandise items corresponding to the charge.

Also, the receiving of the selection of merchandise information may include classifying the merchandise information for each group or each rank of the merchandise information, and recording the classified merchandise information in the merchandise information database. Also, the receiving of the selection of merchandise information may include: determining a number of allowances for selection of the merchandise information for the each group or the each rank, based on the charge; and allowing the merchandise information to be selected from the merchandise information database within the determined number of allowances.

Also, the lotting of the merchandise information may include lotting the merchandise information such that one random merchandise information is selected from among the merchandise information within the merchandise list.

Also, the lotting may include differently granting a rank to the user using the purchasing information of the user; setting a winning probability with respect to the merchandise information in cooperation with the granted rank; and lotting the merchandise information depending on the set winning probability.

Also, the differently granting may include granting the rank to the user corresponding to a number of times merchandise items are purchased by the user, or a purchase price.

Also, the lotting may include differently granting a rank to the user according to a lottery cycle; setting a winning probability with respect to a relatively high rank from among merchandise information within the merchandise list in cooperation with the granted rank; and lotting one merchandise information according to the set winning probability.

Also, when merchandise having an identical rank is registered in the inventory by a predetermined number, the lotting may include lotting merchandise having a rank higher than the identical rank.

Also, the merchandise information database may include a merchandise information package acquired by associating merchandise information having identical characteristics with one another, and when the merchandise information package is registered in the inventory, the lotting may include lotting merchandise information determined in advance.

Also, the method according to the present invention may further include delivering the merchandise registered in the inventory to the user.

In this instance, the delivering may include any one of delivering the merchandise immediately when registering the merchandise in the inventory; regularly delivering the merchandise to the user; delivering the merchandise to the user in accordance with a delivery data inputted by the user; and delivering the merchandise to the user immediately when receiving, from the user, a request of deferred payment.

Also, the method according to an exemplary embodiment of the invention may further include eliminating the merchandise from the inventory and initializing the inventory when the merchandise is delivered.

Also, the method according to an exemplary embodiment of the invention may further include performing a transaction with respect to the merchandise registered in the inventory in cooperation with a predetermined cash transaction site.

Also, the performing the transaction may include performing a transaction using at least one scheme of auction, purchase, and exchange schemes.

Also, the method according to an exemplary embodiment of the invention may further include providing predetermined mileage points to the user when the settling of the charge is completed.

Also, the providing the predetermined mileage points may include providing the mileage point in an accumulated fashion or in a lottery fashion.

Also, the settling of the charge may include settling the charge using the predetermined mileage points when the mileage points are predetermined points or more.

According to an aspect of the present invention, there is provided a system for managing an online shopping mall of a lottery type, the system including: a charge settlement processing unit for settling a charge deposited by the user; a merchandise lotting unit for receiving, from the user based on a merchandise information database, a selection of merchandise information corresponding to at least the charge, recording the received selection in a merchandise list, and lotting merchandise information using the merchandise list; and an inventory control unit for registering the lotted merchandise information in an inventory of the user.

In this instance, the merchandise lotting unit may receive, from the user, a selection of merchandise information on a number of merchandise items corresponding to the charge.

Also, the merchandise information database may classify the merchandise information for each group or each rank of the merchandise information, and record the classified merchandise information, and the merchandise lotting unit may determine a number of allowances for selection of the merchandise information for the each group or the each rank, based on the charge, and allow the merchandise information to be selected from the merchandise information database within the determined number of allowances.

The merchandise lotting unit may lot the merchandise information such that one random merchandise information is selected from among the merchandise information within the merchandise list.

Also, the merchandise lotting unit may (1) differently grant a rank to the user using the purchasing information of the user; (2) set a winning probability with respect to the merchandise information in cooperation with the granted rank; and (3) lot the merchandise information depending on the set winning probability.

Also, the merchandise lotting unit may grant the rank to the user corresponding to a number of times merchandise items are purchased by the user, or a purchase price.

Also, the merchandise lotting unit may (1) differently grant a rank to the user according to a lottery cycle; (2) set a winning probability with respect to a relatively high rank from among merchandise information within the merchandise list in cooperation with the granted rank; and (3) lot one merchandise information according to the set winning probability.

Also, when merchandise having an identical rank is registered in the inventory by a predetermined number, the merchandise lotting unit may lot merchandise having a rank higher than the identical rank.

Also, the merchandise information database may include a merchandise information package acquired by associating merchandise information having identical characteristics with one another, and when the merchandise information package is registered in the inventory, the merchandise lotting unit may lot merchandise information determined in advance.

Also, the system according to another exemplary embodiment of the invention may further include a merchandise delivery unit for delivering the merchandise registered in the inventory to the user.

Also, the merchandise delivery unit may deliver the merchandise immediately when registering the merchandise in the inventory, regularly deliver the merchandise to the user, deliver the merchandise to the user in accordance with a delivery data inputted by the user, or deliver the merchandise to the user immediately when receiving, from the user, a request of a payment on delivery.

Also, the inventory control unit may remove the merchandise from the inventory when the merchandise is delivered, and initialize the inventory.

Also, the system according to another exemplary embodiment of the invention may further a merchandise transaction unit for performing a transaction with respect to the merchandise registered in the inventory in cooperation with a predetermined cash transaction site.

Also, the merchandise transaction unit may perform a transaction using at least one scheme of auction, purchase, and exchange schemes.

Also, the system according to another exemplary embodiment of the invention may further include a mileage point providing unit for providing a predetermined mileage point to the user when the settling of the charge is completed.

Also, the mileage point providing unit may provide the mileage point in an accumulated fashion or in a lottery type.

Also, the charge payment processing unit may pay the charge using the predetermined mileage points when the mileage points are predetermined points or more.

BRIEF DESCRIPTION OF THE DRAWINGS

The above and other aspects of the present invention will become apparent and more readily appreciated from the following detailed description of certain exemplary embodiments of the invention, taken in conjunction with the accompanying drawings of which.

DETAILED DESCRIPTION OF EMBODIMENTS

Figure 1:
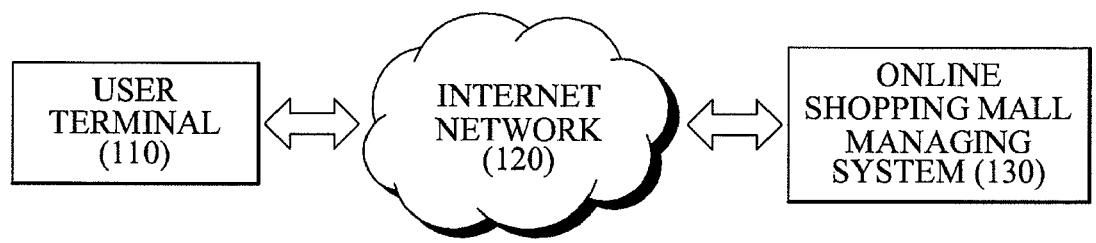
FIG. 1 is a schematic view illustrating a system for managing an online shopping mall using a lottery according to an exemplary embodiment of the invention.

Reference will now be made in detail to exemplary embodiments of the present invention, examples of which are illustrated in the accompanying drawings, wherein like reference numerals refer to the like elements throughout. The exemplary embodiments will be described below with reference to the figures.

When detailed descriptions related to a well-known related function or configuration are determined to make the spirits of the present invention ambiguous, the detailed descriptions will be omitted herein. Also, terms used throughout the present specification are used to appropriately describe exemplary embodiments of the present invention, and thus may be different depending upon a user and an operator's intention, or practices of application fields of the present invention. Therefore, the terms must be defined based on descriptions made through the present disclosure.

FIG. 1 is a schematic view illustrating a system 130 for managing an online shopping mall using a lottery according to an exemplary embodiment of the invention.

Referring to FIG. 1, a user may connect with the system 130 using a user terminal 110. In this instance, the user terminal 110 may communicate with the system 130 via an Internet network 120. Alternatively, the user terminal 110 may communicate with the system 130 via a mobile communication network.

When the user terminal 110 and the system 130 are connected with each other as described above, the user may pay a predetermined charge to the system 130 via the user terminal 110. The system 130 may then confirm the payment of the charge, and conduct a lottery with respect to merchandise according to the charge. In this instance, the system 130 may be set such that merchandise worth at least the same amount as the charge is unconditionally selected by conducting the lottery. Specifically, the system 130 may be set such that the merchandise corresponding to at least the charge paid by the user is won through the lottery. The system 130 may store the merchandise won through the lottery in the inventory of the user.

When the predetermined charge is paid by the user, the system 130 may conduct a lottery with respect to the merchandise corresponding to at least the charge paid by the user, and store the merchandise won through the lottery in an inventory of the user. Specifically, the system 130 does not provide services permitting the user to purchase merchandise by means of the charge paid by the user, but provides, to the user, a specific merchandise won through a lottery by means of the charge paid by the user.

In this instance, the merchandise won through the lottery may be classified for each group and each rank according to the charge. For example, a specific merchandise ranging in value from 10,000 won to 100,000 won may be won through the lottery when charging 10,000 won, and also a specific merchandise ranging from 100,000 won to 1,000,000 won may be won through the lottery when charging 100,000 won. Specifically, according to the present exemplary embodiment, since many merchandise items having various prices may be included within an identical group, a specific merchandise worth at least the charge amount paid by the user may be won at the time of conducting a lottery with respect to the merchandise.

Thus, the system 130 may make the user experience the fun acquired by collecting merchandise items in the inventory of the user. In addition, the system 130 may prevent the user from being defrauded on the basis of the smallest expected value, and further prevent the gambling sprit of users from being incited.

Here, the user terminal 110 may include a fixed communication terminal such as a desktop Personal Computer (PC) or a mobile communication terminal. The mobile communication terminal may include portable equipments having a communication function such as a Personal Digital Cellular (PDC) phone, a Personal Communication Service (PCS) phone, a Personal Handyphone System (PHS) phone, a Code Division Multiple Access (CDMA)-2000 (1X, 3X) phone, a Wideband CDMA (WCDMA) phone, a Dual Band/Dual Mode phone, a Global System for Mobile communications (GSM) phone, a Mobile Broadband System (MBS) phone, a Digital Multimedia Broadcasting (DMB) phone, a smart phone, and a mobile phone.

Also, the mobile communication terminal may include hand-held based wireless communication devices including portable terminals such as a Public Switched Telephone Network (PSTN), a Voice over Internet Protocol (VoIP), a Session Initiation Protocol (SIP), an Media Gateway Control Protocol (MGCP), an Media Gateway Control (MEGACO), a Personal Digital Assistant (PDA), a hand-held PC, a notebook computer, a laptop computer, an wireless broadband (WiBro) terminal, an MPEG Audio Layer-3 (MP3) player, an MD player, and the like, and an International Mobile Telecommunication-2000 (IMT-2000) terminal providing roaming services and expanded mobile communication services, a Universal Mobile Telecommunication service (UMTS) based-terminal, and the like.

Portable electrical and electronic devices such as the above-described portable equipments and hand-held based wireless communication devices may include a predetermined communication module such as a CDMA module, a Bluetooth module, an Infrared Data Association (IrDA) module, a wired/wireless Local Area Network (LAN) card, and a predetermined communication module of a wireless communication device having a Global Positioning System (GPS) chip embedded therein, and may designate terminals including a microprocessor having a multimedia regeneration function equipped therein to thereby perform a predetermined operation.

Hereinafter, a method for managing an online shopping mall of a lottery type according to an embodiment of the present invention will be described in detail.

Figure 2:
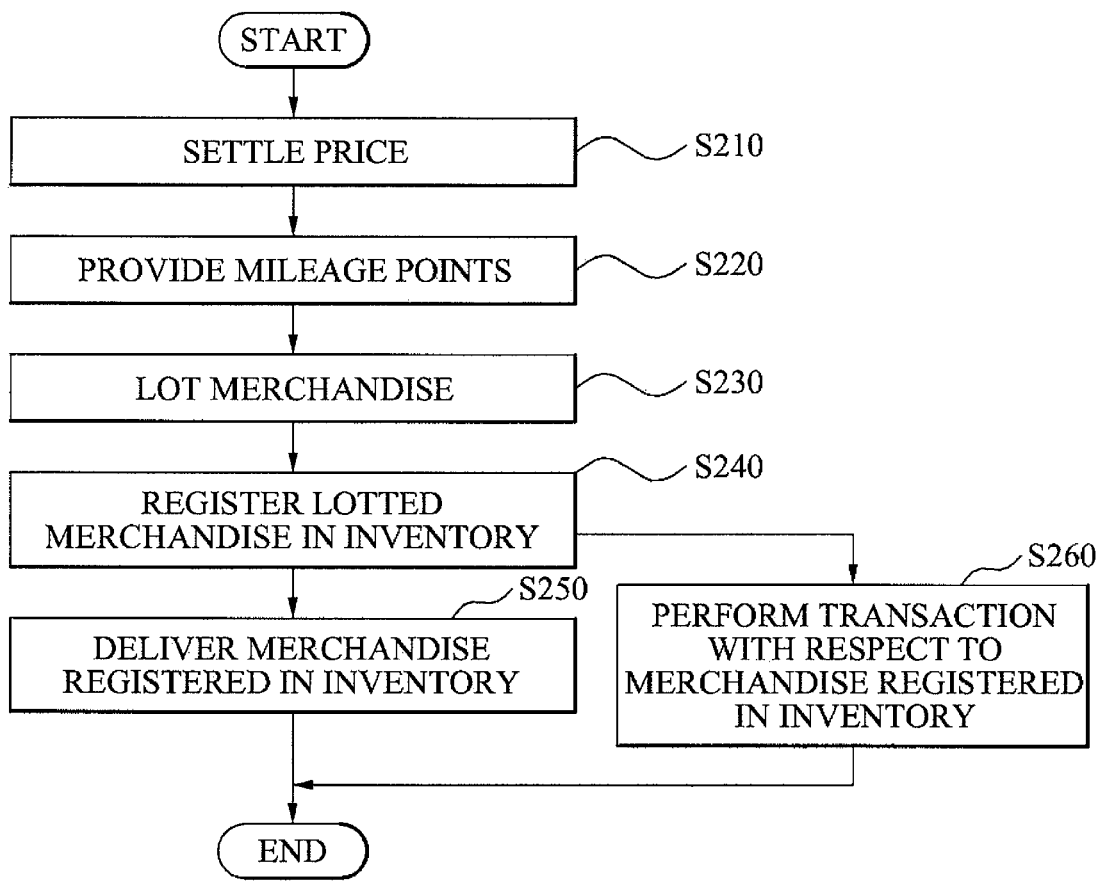
FIG. 2 is a flowchart illustrating a method for managing an online shopping mall using a lottery according to an exemplary embodiment of the invention.

FIG. 2 is a flowchart illustrating a method for managing an online shopping mall using a lottery according to an exemplary embodiment of the invention.

Referring to FIGS. 1 and 2, as to the method according to the present exemplary embodiment, a user may connect with the system 130 for managing an online shopping mall using the user terminal 110. Next, when the user terminal 110 and the system 130 are connected with each other, the user may request to register as a member in the system 130. Then, the system 130 may receive the request to register as a member from the user, and permit the user to be registered as a member according to a predetermined procedure. However, a user's initial registration may perform the following process without executing the above-described member registration process.

Next, when the user executes a log-in process, the system 130 may perform a membership authentication with respect to the user. When the user is authenticated as a member, the system 130 may provide a predetermined charge reception page to the user terminal 110. Thus, the user may deposit the charged amount to the system 130 using the predetermined charge reception page. When the charged amount is not deposited within a contract period, the system 130 does not provide services of the online shopping mall to the user, or may perform a predetermined process for inducing the user to deposit the charged amount such as transmitting a message of requesting depositing of the charged amount.

Next, in operation S210, the system 130 may settle the deposited charged amount. In this instance, the system 130 may perform settlement processing on the charged amount deposited from the user using any one of an Internet banking scheme, a mobile banking scheme, and depositing without bankbook. Also, the system 130 may receive the charged amount using a flat-rate scheme.

As an example, the system 130 may receive, from the user, a charged amount of 50,000 won each month on a flat-rate basis using any one of the Internet banking, the mobile banking, and the depositing without bankbook. As another example, the system 130 may receive, from an account of the user, the charged amount of 50,000 won each month using an automatic payment scheme.

Next, in operation S220, when the charge settlement is completed, the system 130 may provide predetermined mileage points to the user. Specifically, the system 130 may provide mileage points corresponding to the paid charge to the user. In this instance, the system 130 may provide the mileage points in a point accumulated fashion or in a lottery fashion (e.g., a jackpot) at the time of the charge payment. The provided mileage points may be stored in a predetermined mileage point database and accumulated.

As an example for the point accumulated fashion, when it is assumed that the settled charge is 50,000 won, the system 130 may provide, to the user, 2,500 won corresponding to 5% of the charge as the mileage point. As an example for the lottery fashion, the system 130 may provide, to the user, 50,000 won as the mileage points regardless of an amount of the charge by conducting a lottery.

Next, in operation S230, the system 130 may lot merchandise based on a predetermined merchandise information database where merchandise information is recorded, such that merchandise worth at least the charged amount is won through the lottery. Thus, lotteries where nothing is won such as non-winning lotteries are not conducted, that is, merchandise may be won without exception.

For example, when it is assumed that the user pays 10,000 won, the system 130 may select merchandise worth at least 10,000 won from the merchandise information database, and output the selected merchandise as the lottery result. Thus, the user may be given an opportunity in which the merchandise worth at least 10,000 won is won through the lottery. Specifically, as for the user, the merchandise corresponding to 10,000 won may be won, and also merchandise corresponding to 50,000 won or more may be won.

The system 130 may lot merchandise based on a predetermined merchandise list. Here, the merchandise list may designate a list where merchandise desired by the user is recorded, and may be made by the user and registered in the predetermined merchandise list database. The merchandise list may include merchandise selected by the user from among the merchandise recorded in the merchandise information database.

As an example, when the user wants to increase a number of merchandise included in the merchandise list, a large number of merchandise having a relatively lower rank may be selected from among the merchandise information database to thereby compose the merchandise list. For example, the user may select a relatively great number of merchandise such as eight electric shavers of a tenth rank and two electric shavers of a ninth rank to thereby compose the merchandise list.

As another example, when the user takes into consideration types (qualities) of the merchandise included in the merchandise list, merchandise having a relatively higher rank may be selected from among the merchandise information database to thereby compose the merchandise list. For example, the user may select one electric shaver of a fifth rank and one electric shaver of a tenth rank to thereby compose the merchandise list.

Specifically, according to the present exemplary embodiment, merchandise may be selected according to a user's intention to thereby compose the merchandise list.

Also, the system 130 may adjust a number of merchandise to be included in the merchandise list, based on the payment deposited by the user.

For example, the system 130 may give an authorization allowing the user depositing 10,000 won as the payment to select five merchandise items to compose the merchandise list, and also another authorization allowing the user depositing 20,000 won as the payment to select ten merchandise items from the merchandise information database.

As another example, the system 130 may give a number of allowances for selection of the merchandise to be included in the merchandise list for each group or each rank of the merchandise, based on the payment deposited by the user.

Specifically, the system 130 may determine a number or a rank of the merchandise capable of being selected by the user as the number of allowances for selection, based on the payment.

Next, the system 130 may allow merchandise to be selected by the user from the merchandise information database within the determined number of allowances for selection, and make the merchandise list using the selected merchandise.

For example, the system 130 may determine such that two from merchandise items of the tenth rank are given to a user A depositing a payment of 10,000 won as the number of allowances for selection, whereas two from merchandise items of the fifth rank and one from merchandise items of the first rank are given to a user B depositing a payment of 100,000 won as the number of allowances for selection. Thus, the user B may make a merchandise list including merchandise having a relatively higher rank in comparison with the user B. Also, the system 130 may be capable of making the user B expect the acquisition of desired merchandise through a lottery, which leads to attracting interest of the user B.

Also, according to the present exemplary embodiment, the system 130 may induce the user to deposit a relatively larger amount than the charge for the purpose of acquiring the desired merchandise, and thus increasing a benefit of an operator of the system 130.

As described above, since the system 130 may lot merchandise based on the merchandise list, merchandise desired by the user may be won through the lottery.

In operation S230, the system 130 may differently grant a rank to the user using purchasing information of the user. In this instance, the purchasing information may include a number of times merchandise is purchased by the user, that is, a number of purchase times, or a purchase price. Specifically, the system 130 may differently grant the rank to the user according to the number of purchase times, or the purchase price.

As an example, when the number of purchase times of the user is 10, and the number of purchase times of another user is 5, the system 130 may grant a second rank to the user, and a third rank to the other user. As another example, when the purchase price of the user is 100,000 won and the purchase price of the other user is 50,000 won, the system 130 may grant a second rank to the user and a third rank to the other user.

Here, the number of purchase times may designate a number of times the system 130 lots merchandise by depositing the charge by the user. The number of purchase times may be calculated by a predetermined period unit. For example, the number of purchase times may be calculated in a unit of one month or one year. The purchasing price may designate an amount of a charge for one-time deposit or a sum of deposit conducted during a predetermined period (e.g., one month or one year).

As another example for granting the rank, when merchandise won through the preceding lottery corresponding to a merchandise information package determined in advance, or merchandise having a relatively low winning probability, the system 130 may grant a relatively higher rank to the corresponding user.

For example, when 'soap', 'electric shaver', and 'towel' each regarding a bath item may be present from among merchandise won through the lottery, the system 130 may grant, to the user, a rank higher than that of another user.

Also, when 'car' having a lowest winning probability is present from among the merchandise won through the lottery, the system 130 may grant a relatively high rank to the corresponding user.

As described above, when a rank is granted to the corresponding user, the system 130 may set the winning probability in cooperation with the granted rank. Specifically, when the granted rank is relatively high in the case of an identical amount of the charge to be deposited by the user, a winning probability for merchandise having a relatively higher rank with respect to the corresponding charge may be set to be high. Conversely, when the granted rank is relatively low in the case of an identical amount of the charge to be deposited by the user, a winning probability for merchandise having a relatively higher rank with respect to the corresponding charge may be set to be low.

As an example, when a user having the relatively high rank deposits 10,000 won, the system 130 may set a winning probability for merchandise having a relatively higher rank with respect to 10,000 won to be high. Conversely, a user having the relatively low rank deposits 10,000 won, the system 130 may set the winning probability for merchandise having a relatively higher rank with respect to 10,000 won to be low.

The system 130 may lot the merchandise according to the set winning probability. Thus, the system 130 may set a winning probability for merchandise having a relatively high rank with respect to the corresponding charge, based on the purchasing information, and may lot the merchandise using the set winning probability.

Also, when the rank of the user satisfies a predetermined condition, the system 130 may provide a predetermined special benefit to the user having a relatively higher rank such as providing a larger number of lotteries to the corresponding user, so that services of the online shopping mall according to the present exemplary embodiment are constantly provided to the user for a relatively longer period of time. For example, the system 130 may provide an opportunity for conducting a one-time lottery per 10,000 won to a user having a first rank, and also provide an opportunity for conducting two-time lottery per the same 10,000 won to a user having a tenth rank.

Alternatively, in operation S230, the system 130 may differently grant a rank to the user according to a lottery cycle. Specifically, the system 130 may grant a relatively higher rank to the user along with a reduction in the lottery cycle even in the case of an identical amount of the charge.

Here, the lottery cycle may be set by the user. For example, the user may set the lottery cycle into one day, one week, one month, and the like. Thus, when the user sets the lottery cycle into one day, the system 130 may lot the merchandise every day. Also, when the user sets the lottery cycle into one week and one month, the system 130 may lot the merchandise every week and every month.

The system 130 may set the winning probability in cooperation with the granted ranks as described above. Specifically, when the granted rank is relatively high, the system 130 may set a winning probability for a merchandise item having a relatively high rank with respect to the corresponding charge to be high. Conversely, when the granted rank is relatively low, the system 130 may set the winning probability for a merchandise item having a relatively high rank with respect to the corresponding charge to be low.

As an example, when the charge is 10,000 won in the case of conducting a lottery every day, the system 130 may set a winning probability for merchandise having the highest rank with respect to 10,000 won to be high. Conversely, when the charge is 10,000 won in the case of conducting a lottery every week or every month, the system 130 may set the winning probability to be low.

The system 130 may lot the merchandise according to the set winning probability. Thus, the system 130 may set a winning probability for merchandise having a relatively high rank with respect to the corresponding charge based on the lottery cycle, and lot the merchandise using the set winning probability.

Next, in operation S240, the system 130 may accumulate the merchandise won through the lottery in the inventory of the user, and register (store) the accumulated merchandise. In this instance, when merchandise items having an identical rank are registered in the inventory by a predetermined number, the system 130 may lot merchandise having a rank higher than that of the merchandise registered in the inventory according to a lottery request received from the user, or may immediately lot the merchandise having a rank higher than that of the merchandise registered in the inventory.

As an example, when twenty merchandise items having the tenth rank are registered in the inventory, the system 130 may lot merchandise having the ninth rank according to the lottery request of the user, or instantly lot the merchandise. As another example, when twenty merchandise items having the ninth rank are registered in the inventory, the system 130 may lot merchandise having the eighth rank according to the lottery request of the user, or may immediately lot the merchandise.

Next, in operation S250, the system 130 may deliver the merchandise registered in the inventory to the user. In this instance, the system 130 may deliver the registered merchandise to the user immediately after the merchandise is registered in the inventory. Also, the system 130 may regularly deliver the merchandise registered in the inventory to the user.

Also, the system 130 may receive a desired delivery date inputted by the user, and deliver the merchandise to the user in accordance with the desired delivery date. Also, the system 130 may deliver the merchandise registered in the inventory to the user immediately after receiving, from the user, a request of payment on delivery for the delivery charge.

In operation S250, when the merchandise registered in the inventory is delivered, the system 130 may remove the delivered merchandise from the inventory. Specifically, the system 130 may initialize the inventory to be in a state before the merchandise is delivered.

As an example, in the case where a camera and a Personal Computer (PC) are registered in the inventory of the user, it is assumed that the camera and PC are registered in A and B regions of the inventory, respectively. In this case, when the PC is delivered, the system 130 may remove the PC registered in B region of the inventory, thereby initializing B region.

In this instance, the merchandise, once removed from the inventory due to the delivery, is not allowed to be re-registered in the inventory. Registering an identical merchandise item with the removed merchandise item in the inventory may be allowed only by a lottery process.

The user may sell the merchandise registered in the inventory to another user by the above-described operation S240, and buy merchandise registered in an inventory of the other user. Specifically, a transaction between the user and the other user may be performed with respect to the merchandise registered in their own inventory, respectively.

For this purpose, in operation S260, the system 130 may manage a predetermined cash transaction site (e.g., Item bay site), so that a transaction between the user and another user is performed with respect to the merchandise registered in the inventory. In this instance, the system 130 may be embodied such that the transaction is performed with respect to the merchandise using an auction scheme or a purchase scheme (immediate purchase) scheme. A process where the transaction is performed with respect to the merchandise registered in the inventory will be herein described in detail.

First, the user may select, from the inventory, merchandise which the user desires to sell, and post the selected merchandise to the predetermined cash transaction site. Then, when another user requests a purchase for the posted merchandise, the system 130 may request a charge payment for the requested merchandise to the other user using the cash transaction site. Then, when the other user pays the charge for the requested merchandise item in response to the request of the charge payment, the system 130 may register the merchandise item in the inventory of the other user, and remove the sold merchandise item from the inventory of the user.

In the process, the system 130 may post the merchandise of the original price plus a predetermined amount at the time of posting the merchandise to the cash transaction site. Specifically, the system 130 may offer the charge inclusive of a predetermined commission at the time of transaction of the merchandise.

Accordingly, the system 130 may request the payment for the charge inclusive of a predetermined amount to a purchaser or a seller at the time of transaction of the merchandise. In addition, when the purchaser performs the payment for the charge according to the request of the payment, the system 130 may remit, to the seller, an amount corresponding to an original price of the merchandise exclusive of the predetermined amount.

Also, as necessary, the system 130 may charge a predetermined commission for the shopping mall management with respect to the seller of the merchandiser item.

As a result, an operator of the system 130 may increase a benefit of the predetermined amount at the time of selling the merchandise.

For example, when an original price (that is, the consumer's price) of cosmetics is 10,000 won, the system 130 may offer 11,000 won, that is, the original price of 10,000 won plus 1,000 won as the selling price at the time of transaction of the cosmetics. Next, the system 130 may transmit the original price of 10,000 won to the seller of the cosmetics, and also transmit the balance of 1,000 won to the operator of the system 130.

Alternatively, the user may exchange the merchandise item registered in the inventory by operation S240 with a merchandise item registered in an inventory of another user. In this instance, the exchange may be desirably performed with respect to merchandise having an identical rank.

Further, a package concept is adopted for the merchandise registered in the inventory. In this regard, when different merchandise having an identical rank is collected in the inventory, the system 130 may provide, to the user, a lottery ticket for lotting merchandise having a rank higher than that of the different merchandise. As a result, the system 130 may lot merchandise having a relatively higher rank using the provided lottery ticket, and provide the merchandise item won through the lottery to the user.

For example, when a camera, an electric shaver, and a wallet are registered in the inventory of the user in the case of a merchandise item package including the camera, the electric shaver, and the wallet, and each having an identical rank, the system 130 may lot merchandise having a rank higher than that of the merchandise item package and provide the merchandise won through the lottery to the user.

As another example, the system 130 may make merchandise having a rank different with one another into a merchandise item package, thereby providing an opportunity for lotting merchandise having a relatively higher rank to the user. For example, when three merchandise items of the tenth rank and two merchandise items of the ninth rank are registered in the inventory of the user, the system 130 may recognize that these merchandise items are included in one merchandise item package, and provide, to the corresponding user, a lottery opportunity with respect to one merchandise item of the eighth rank. In this instance, the system 130 may remove, from the inventory of the corresponding user, the three merchandise items of the tenth rank and two merchandise items of the ninth rank, and register the merchandise of the eighth newly won through the lottery in the inventory.

Accordingly, the user may purchase merchandise required for making the package from the other user in order to collect merchandise in the inventory and make the collected merchandise into the package. Specifically, in order to make one merchandise package, the user may connect with the cash transaction site and purchase desired merchandise from the other user.

The method for managing an online shopping mall of a lottery type according to an embodiment of the present invention may be implemented such that any one rank from among ranks with respect to the corresponding charge is determined through a lottery according to a user's request, any one from among merchandise having the determined rank is randomly selected, and the selected merchandise item is delivered to the user. In this case, the user could not know what merchandise item is selected until the selected merchandise item is delivered.

Figure 3:
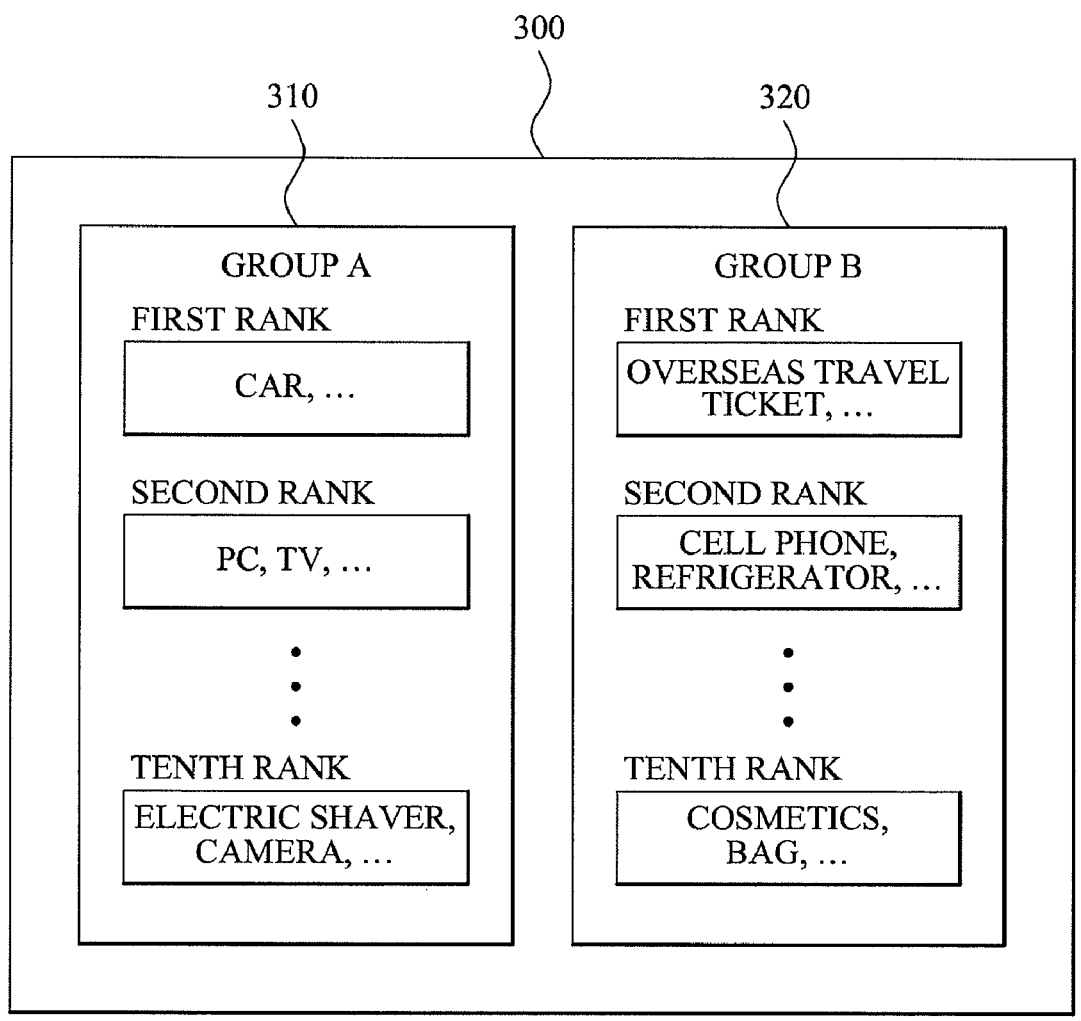
FIG. 3 is a diagram illustrating an example of a process where merchandise is recorded in a database in the method of FIG. 2.

FIG. 3 is a diagram illustrating an example of a process where merchandise items are recorded in a database in the method of FIG. 2.

Referring to FIG. 3, merchandise won through a lottery may be stored in a merchandise information database 300. This merchandise may be classified for each group or each rank of the merchandise, and the classified merchandise recorded in the merchandise information database 200. Specifically, as illustrated in FIG. 3, the merchandise may be divided into a group A 310 and a group B 320 and recorded. Here, merchandise recorded in the group A 310 may be divided ranging from a first rank to a tenth rank. Also, merchandise recorded in the group B 320 may be divided ranging from a first rank to a tenth rank.

By classifying the merchandise for each group within the merchandise information database 300, the merchandise existing within the groups selected by each user may be won through a lottery. Accordingly, the user may select a group where merchandise desired by the user exist, and thus increasing a winning probability in which merchandise desired by the user is won through the lottery.

The group may be divided within the merchandise information database 300 according to an amount of the charge to be settled. Specifically, the group A may include merchandise capable of being won when the amount of the charge is 10,000 won, and the group B may include merchandise capable of being won when the amount of the charge is 100,000 won. In this regard, the user may be allowed to select the group A when depositing 10,000 won, and select the group B when depositing 100,000 won.

Thus, in order to allow the user to select the group, the system 130 illustrated in FIG. 1 may provide, to the user terminal 110 illustrated in FIG. 1, a group selection page for permitting the user to directly select the group.

Figure 4:
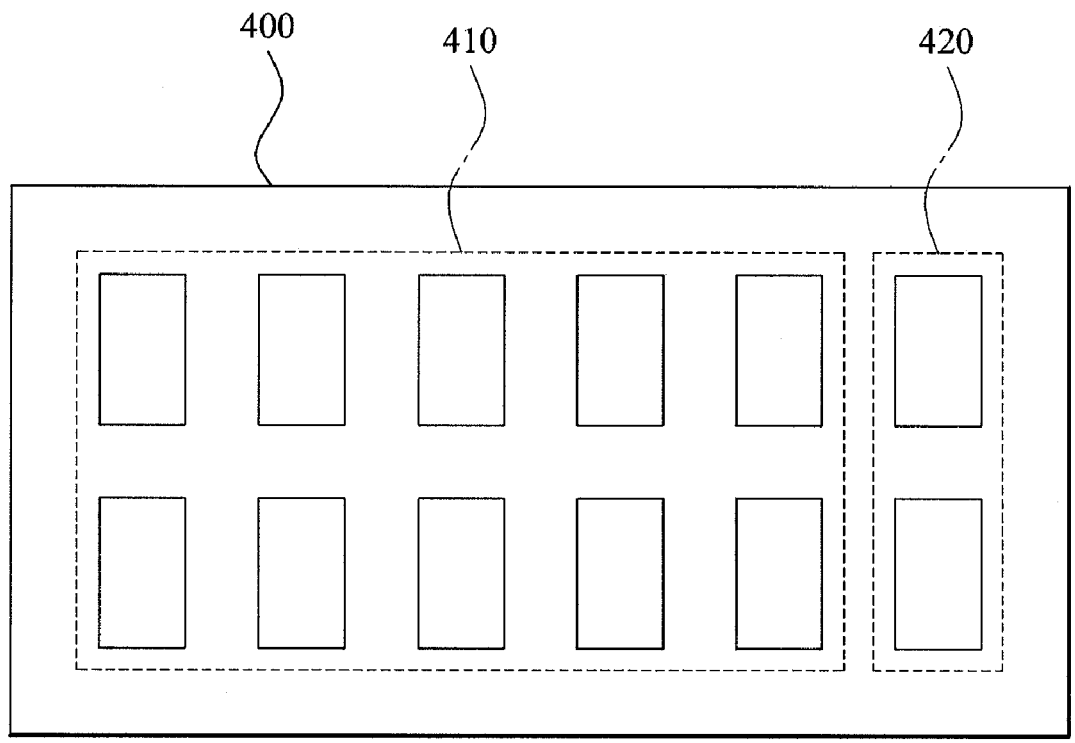
FIGS. 4 and 5 are diagrams illustrating an example of an inventory where merchandise is registered in the method of FIG. 2.
Figure 5:
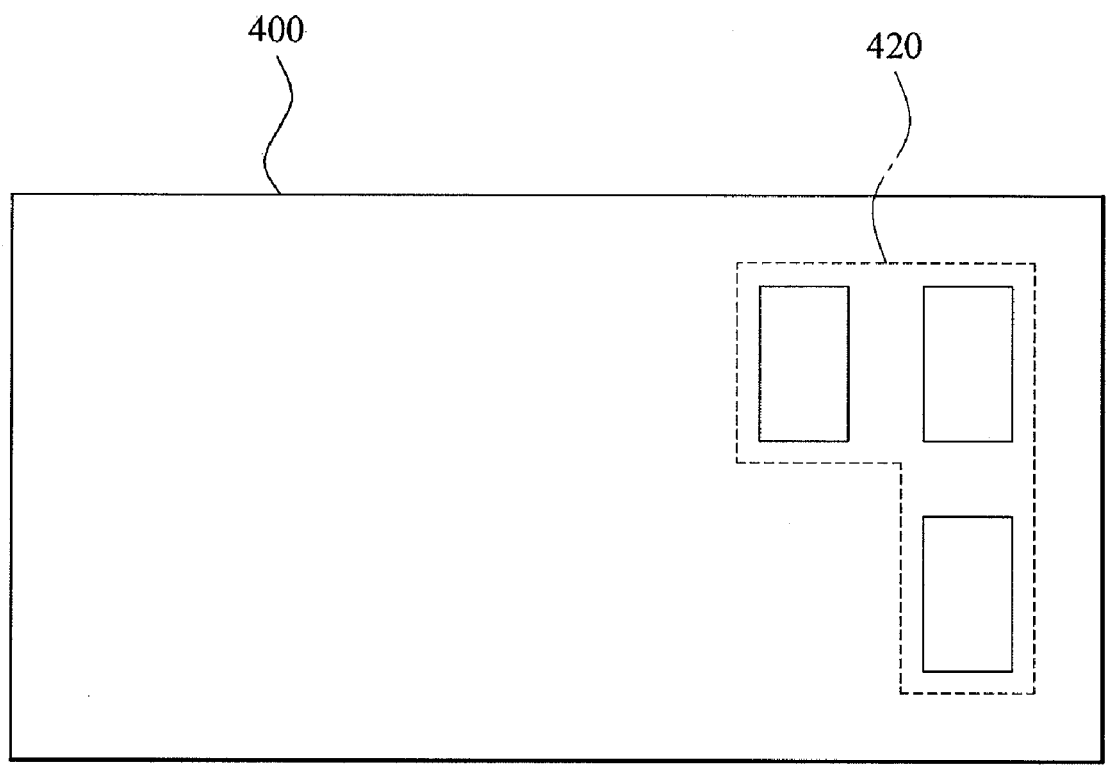

FIGS. 4 and 5 are diagrams illustrating an example of an inventory where merchandise is registered in the method of FIG. 2.

Referring to FIG. 4, the system 130 may include an inventory 400 for registering (storing) merchandise won through a lottery. The inventory 400 may store merchandise purchased from another user or merchandise exchanged with another user other than the won merchandise.

In the inventory 400 illustrated in FIG. 4, ten merchandise items 410 of a tenth rank and two merchandise items 420 of a ninth rank are registered. It is assumed that one merchandise item 420 of the ninth rank is allowed to be lotted when ten merchandise items 410 of the tenth rank are collected. In this case, since ten merchandise items 410 of the tenth rank are registered in the inventory 400, the system 130 may provide, to the user possessing the inventory 400, a lottery ticket for lotting one merchandise item 420 of the ninth rank. When the user requests a lottery with respect to the merchandise item 420 of the ninth rank using the lottery ticket, the system 130 may lot the merchandise item 420 of the ninth rank. Then, the system 130 may register the merchandise item won through the lottery in the inventory 400 of the user.

As a result, in the inventory 500 of the user, two existing merchandise items 420 of the ninth rank and one merchandise item 420 of the ninth rank newly registered through the lottery may be registered. Specifically, a total of three merchandise items 420 of the ninth rank may be registered in the inventory 400.

In this manner, in the inventory 400, merchandise won through the lottery and merchandise acquired by performing a transaction in purchase, auction, and exchange schemes may be registered. Also, when merchandise having an identical rank is registered in the inventory 400 by a predetermined number, the user may request a lottery with respect to merchandise having a rank higher than the identical rank.

The method for managing the online shopping mall of the lottery type according to the above-described exemplary embodiments of the present invention may be recorded in computer-readable media including program instructions to implement various operations embodied by a computer. The media may also include, alone or in combination with the program instructions, data files, data structures, and the like. The media and program instructions may be those specially designed and constructed for embodiments of the present invention, or they may be of the kind well-known and available to those having skill in the computer software arts. Examples of computer-readable media include magnetic media such as hard disks, floppy disks, and magnetic tape; optical media such as CD ROM disks and DVD; magneto-optical media such as optical disks; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described exemplary embodiments of the present invention.

Figure 6:
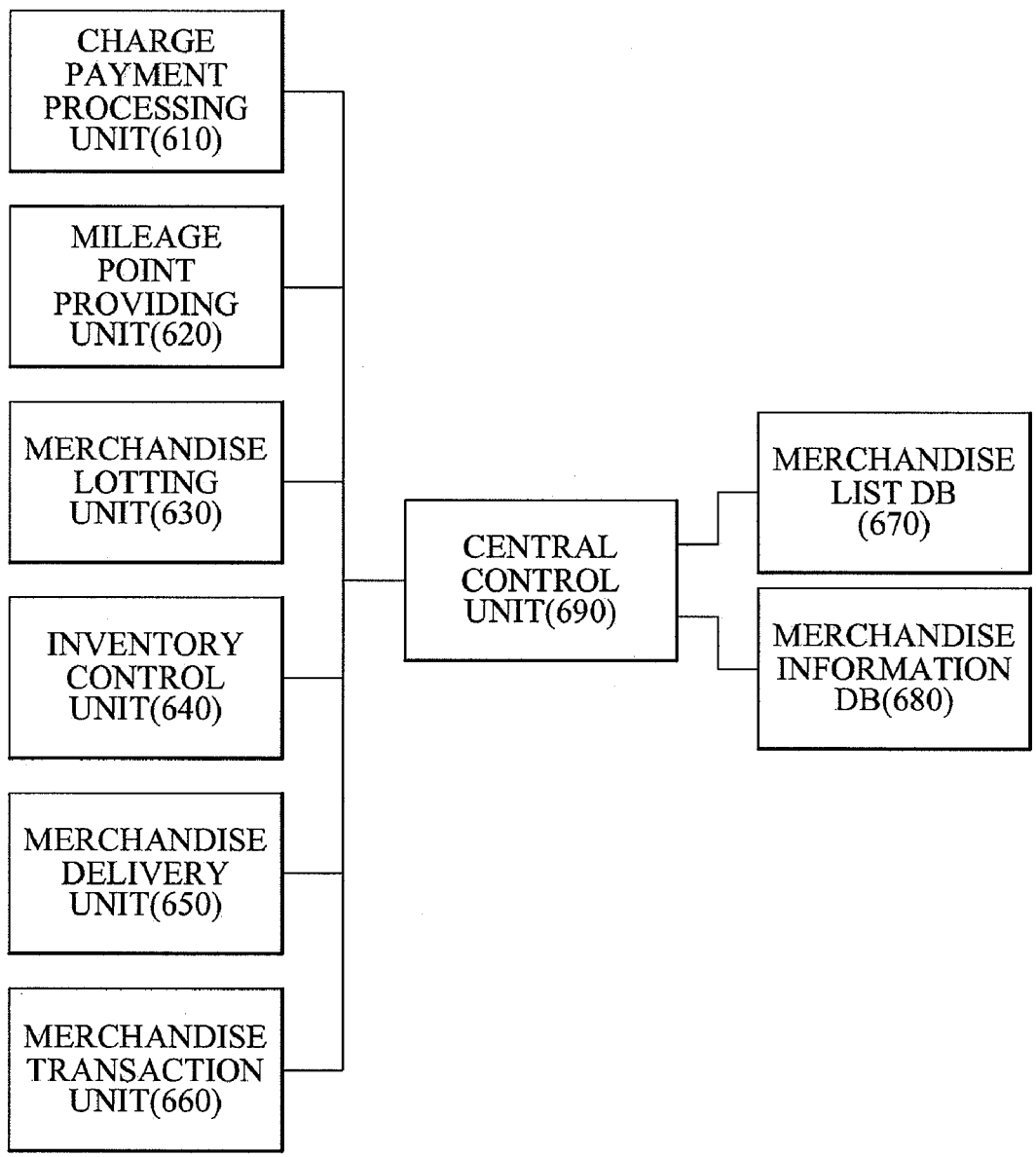
FIG. 6 is a block diagram illustrating a system for managing an online shopping mall using a lottery according to an exemplary embodiment of the invention.

FIG. 6 is a block diagram illustrating a system for managing an online shopping mall using a lottery according to an exemplary embodiment of the invention.

Referring to FIG. 6, the system 130 according to the present exemplary embodiment may include a charge settlement processing unit 610, a mileage point providing unit 620, a merchandise lotting unit 630, an inventory control unit 640, a merchandise delivery unit 650, a merchandise transaction unit 660, a merchandise list database 670, a merchandise information database 680, and a central control unit 690.

The charge settlement processing unit 610 may settle the charge with a deposit when a predetermined charged amount is deposited by a user connecting with the system 130 via a member registration and a login. In this instance, the charge settlement processing unit 610 may settle the charge with a deposit by the user using any one of Internet banking, mobile banking, and depositing without bankbook. Also, the charge settlement processing unit 610 may receive the charge using a flat-rate scheme.

As an example, the charge settlement processing unit 610 may receive, from the user, a payment of 50,000 won each month on a flat-rate basis using any one of the Internet banking, mobile banking, and depositing without bankbook. As another example, the charge Settlement processing unit 610 may receive, from an account of the user, the payment of 50,000 won for each month using an automatic payment scheme.

The mileage point providing unit 620 may provide predetermined mileage points to the user depositing the charge when the charge is paid. Specifically, the mileage point providing unit 620 may provide mileage points corresponding to the paid charge to the user. In this instance, the mileage point providing unit 620 may provide the mileage points in a point accumulated fashion or in a lottery fashion (e.g., a jackpot) at the time of the charge settlement. The provided mileage points may be stored in a predetermined mileage point database (not shown) and accumulated.

As an example for the point accumulated fashion, when the settled charge is 50,000 won, the mileage point providing unit 620 may provide, to the user, 2,500 won corresponding to 5% of the charge as the mileage point. As an example for the lottery type, the mileage point providing unit 620 may provide, to the user, 50,000 won as the mileage points regardless of an amount of the charge by conducting a lottery.

The merchandise lotting unit 630 may lot merchandise based on a predetermined merchandise information database where merchandise information is recorded, such that a merchandise item worth at least the same amount as the charge is won through the lottery.

As an example, when the user deposits 10,000 won, the merchandise lotting unit 630 may select merchandise worth at least 10,000 won from the merchandise information database 680, and output the selected merchandise as the lottery result. Thus, the user may be given an opportunity in which the merchandise corresponding to at least 10,000 won is won through the lottery. Specifically, as for the user, the merchandise corresponding to 10,000 won may be won, and also merchandise corresponding to 50,000 won or more may be won.

The merchandise lotting unit 630 may lot merchandise based on a predetermined merchandise list. Here, the merchandise list may designate a list where merchandise desired by the user is recorded, and may be made by the user and registered. The merchandise list may include merchandise selected by the user from among the merchandise recorded in the merchandise information database 680.

The merchandise lotting unit 630 may lot merchandise based on the merchandise list, so that merchandise desired by the user may be won through the lottery.

The merchandise lotting unit 630 may differently grant a rank to the user using purchasing information of the user. The purchasing information may include a number of times merchandise is purchased by the user, that is, a number of purchase times, or a purchase price. Specifically, the merchandise lotting unit 630 may differently grant the rank to the user according to the number of purchase times, or the purchase price.

As an example, when the number of purchase times of the user is 10, and the number of purchase times of another user is 5, the merchandise lotting unit 630 may grant a second rank to the user, and a third rank to the other user. As another example, when the purchase price of the user is 100,000 won and the purchase price of the other user is 50,000 won, the merchandise lotting unit 630 may grant a second rank to the user and a third rank to the other user.

When the rank is granted as described above, the merchandise lotting unit 630 may set a winning probability in cooperation with the granted rank. Specifically, when the granted rank is relatively high in the case of an identical amount of the charge to be deposited by the user, the merchandise lotting unit 630 may set a winning probability for merchandise having a relatively higher rank with respect to the corresponding charge to be high. Conversely, when the granted rank is relatively low in the case of an identical amount of the charge to be deposited by the user, the merchandise lotting unit 630 may set a winning probability for merchandise having a relatively higher rank with respect to the corresponding charge to be low.

As an example, when a user having the relatively high rank deposits 10,000 won, the merchandise lotting unit 630 may set a winning probability for merchandise having a relatively higher rank with respect to 10,000 won to be high. Conversely, a user having the relatively low rank deposits 10,000 won, the merchandise lotting unit 630 may set the winning probability for merchandise having a relatively higher rank with respect to 10,000 won to be low.

The merchandise lotting unit 630 may lot the merchandise according to the set winning probability. Thus, the merchandise lotting unit 630 may set a winning probability for merchandise having a relatively high rank with respect to the corresponding charge, based on the purchasing information, and may lot the merchandise using the set winning probability.

Also, the merchandise lotting unit 630 may differently grant a rank to the user according to a lottery cycle. Specifically, the merchandise lotting unit 630 may grant a relatively higher rank to the user along with a reduction in the lottery cycle even in the case of an identical amount of the charge.

Here, the lottery cycle may be set by the user. For example, the user may set the lottery cycle into one day, one week, one month, and the like. Thus, when the user sets the lottery cycle into one day, the merchandise lotting unit 130 may lot the merchandise items every day. Also, when the user sets the lottery cycle into one week and one month, the merchandise lotting unit 130 may lot the merchandise items every week and every month.

When the rank is granted as described above, the merchandise lotting unit 630 may set a winning probability in cooperation with the granted rank. Specifically, when the granted rank is relatively high, the merchandise lotting unit 630 may set a winning probability for merchandise having a relatively higher rank with respect to the corresponding charge to be high. Conversely, when the granted rank is relatively low, the merchandise lotting unit 630 may set a winning probability for merchandise having a relatively higher rank with respect to the corresponding charge to be low.

As an example, when the charge is 10,000 won in the case of conducting a lottery every day, the merchandise lotting unit 630 may set a winning probability for merchandise having the highest rank with respect to 10,000 won to be high. Unlike this, when the charge is 10,000 won in the case of conducting a lottery every week or every month, the merchandise lotting unit 630 may set the winning probability to be low.

The merchandise lotting unit 630 may lot the merchandise according to the set winning probability. Thus, the merchandise lotting unit 630 may set a winning probability for merchandise having a relatively high rank with respect to the corresponding charge based on the lottery cycle, and lot the merchandise using the set winning probability.

The inventory control unit 640 may accumulate the merchandise won through the lottery in the inventory of the user, and register (store) the accumulated merchandise. In this instance, when merchandise items having an identical rank are registered in the inventory by a predetermined number, the merchandise lotting unit 630 may lot merchandise having a rank higher than that of the merchandise registered in the inventory according to a lottery request received from the user, or may immediately lot the merchandise having a rank higher than that of the merchandise registered in the inventory.

As an example, when twenty merchandise items having the tenth rank are registered in the inventory, the merchandise lotting unit 630 may lot merchandise having the ninth rank according to the lottery request of the user, or instantly lot the merchandise. As another example, when twenty merchandise items having the ninth rank are registered in the inventory, the merchandise lotting unit 630 may lot merchandise having the eighth rank according to the lottery request of the user, or may immediately lot the merchandise.

The merchandise delivery unit 650 may deliver the merchandise registered in the inventory to the user. In this instance, the merchandise delivery unit 650 may deliver the registered merchandise to the user immediately after the merchandise is registered in the inventory. Also, the merchandise delivery unit 650 may deliver the merchandise registered in the inventory to the user at regular intervals.

Also, the merchandise delivery unit 650 may receive a desired delivery date inputted by the user, and deliver the merchandise to the user in accordance with the desired delivery date. Also, the merchandise delivery unit 650 may deliver the merchandise registered in the inventory to the user immediately after receiving, from the user, a request of payment on delivery for the delivery charge.

When the merchandise registered in the inventory is delivered by the merchandise delivery unit 650, the inventory control unit 640 may remove the delivered merchandise from the inventory. Specifically, the inventory control unit 640 may initialize the inventory to be in a state before the merchandise is delivered.

As an example, in the case where a camera and a PC are registered in the inventory of the user, it is assumed that the camera and PC are registered in A and B regions of the inventory, respectively. In this case, when the PC is delivered, the inventory control unit 640 may remove the PC registered in B region of the inventory, thereby initializing B region.

The merchandise transaction unit 660 may provide transaction services between users in cooperation with a predetermined cash transaction site. Specifically, so that a transaction is performed with respect to the merchandise registered in the inventory of the user with another user, the merchandise transaction unit 660 may post the merchandise to the cash transaction site. Then, when a request for the transaction is received from the other user, the transaction is allowed to be performed with respect to the merchandise between the user and the other user. In this instance, the merchandise transaction unit 660 may provide the transaction services using any one of auction, purchase, and exchange schemes. Here, the exchange scheme may be performed with respect to an identical rank.

The merchandise transaction unit 660 may post the merchandise at the original price plus a predetermined amount at the time of posting the merchandise to the cash transaction site. Specifically, the merchandise transaction unit 660 may offer the charge inclusive of a predetermined commission at the time of transaction of the merchandise.

Accordingly, the merchandise transaction unit 660 may request the payment for the charge inclusive of a predetermined amount to a purchaser or a seller at the time of transaction of the merchandise. In addition, when the purchaser performs the payment for the charge according to the request of the payment, the merchandise transaction unit 130 may remit, to the seller, an amount corresponding to an original price of the merchandise exclusive of the predetermined amount.

As a result, an operator of the system 130 may increase a benefit of the predetermined amount at the time of selling the merchandise.

For example, when an original price (that is, the consumer's price) of cosmetics is 10,000 won, the merchandise transaction unit 660 may offer 11,000 won, that is, the original price of 10,000 won plus 1,000 won as the selling price at the time of transaction of the cosmetics. Next, the merchandise transaction unit 660 may transmit the original price of 10,000 won to the seller of the cosmetics, and also transmit the balance of 1,000 won to the operator of the system 130.

The merchandise information database 680 may store a predetermined merchandise capable of being provided through a lottery. In this instance, the merchandise information database 680 may classify the merchandise for each group or each rank and record the classified merchandise. Specifically, the merchandise information database 680 may divide, as illustrated in FIG. 3, the merchandise into the group A 310 and the group B 320, and record the divided merchandise. Also, the merchandise information database 680 may divide the merchandise recorded in the group A 310 or the group B 320, respectively, ranging from a first rank to a tenth rank.

By classifying the merchandise for each group by the merchandise information database 680, the merchandise existing within the groups selected by each user may be won through a lottery. Accordingly, the user may select a group where merchandise desired by the user exist, and thus increasing a winning probability in which merchandise desired by the user is won through the lottery.

The merchandise list database 670 may store a predetermined merchandise list. Here, the merchandise list may designate a list where merchandise desired by the user is recorded, and may be made by the user and registered. The merchandise list may include merchandise selected by the user from among the merchandise recorded in the merchandise information database 680. Specifically, the merchandise list may be constructed such that the user freely selects desired merchandise. The system 130 according to the present exemplary embodiment may lot the merchandise of the merchandise list to be won through a lottery, and provide the won merchandise to the user.

Descriptions of the merchandise list used by the merchandise lotting unit 530 have been already given above, and thus the repeated description will be herein omitted.

The central control unit 690 may control all operations of the system 130. specifically, the central control unit 690 may control all devices of the system 130 including the charge settlement processing unit 610, the mileage point providing unit 620, the merchandise lotting unit 630, the inventory control unit 640, the merchandise delivery unit 650, the merchandise transaction unit 660, the merchandise list database 670, and the merchandise information database 680.

As described above, the method and system for managing the online shopping mall of the lottery type according to exemplary embodiments of the invention may provide merchandise won through a lottery to the user when the payment is deposited by the user, unlike the conventional system for managing the online shopping mall which sells merchandise when a purchase request for the merchandise is received from the user. In this instance, the method and system according to exemplary embodiments of the invention may allow the merchandise worth at least the charged amount to be won through the lottery on the basis of the smallest expected value, thereby preventing the user from being defrauded, and further preventing the gambling sprit of the user from being incited.

Also, the method and system according to exemplary embodiments of the invention may register the merchandise won through the lottery in the inventory of the user, thereby making the user experience the fun acquired by collecting the won merchandise in one's own inventory. Also, the method and system according to exemplary embodiments of the invention may conduct a lottery based on the merchandise list where merchandise desired by the user is recorded, thereby increasing a winning probability in which the merchandise desired by the use is won through the lottery.

Also, when merchandise having an identical rank is registered by a predetermined number in the inventory, the user is given a lottery opportunity for merchandise having a rank higher than the identical rank, thereby inducing the user to collect a larger number of merchandise items in the inventory.

Also, the method and system according to exemplary embodiments of the invention may manage an offline shop as well as the online shop. In this case, a terminal such as PC available in an online and merchandise may be installed in the offline shop. The user (customer) may pay for the charge in the offline shop. In the case of the user preliminary registered, a person related to the offline shop (operator or shop clerk) may connect with the system for managing the online shopping mall of an embodiment of the invention using the terminal, and conduct a lottery. However, in the case of a new user, the user is required to first execute a member registration, and then the lottery may be conducted.

Also, the system according to another exemplary embodiment may conduct a one-time lottery without executing the member registration. Specifically, the system may conduct a one-time lottery without requiring the member registration regarded as a troublesome task, based on the offline condition.

For this purpose, the system may authorize the corresponding user to conduct the one-time lottery when the charge payment is completed with respect to the charge. Also, the system may remove validity of the one-time lottery after the one-time lottery is conducted.

Thus, the system may provide, to the user, optimum services of the online shopping mall without requiring the member registration.

When the lottery is completed, the user may select the corresponding offline shop through the terminal. Then, the system may deliver merchandise won through the lottery to the selected offline shop. The person related to the offline shop may directly provide the won merchandise to the user. When the won merchandise has a relatively high price, the merchandise may be delivered to a delivery address desired by the user instead of directly providing the merchandise in the offline shop.

Also, the method and system according to exemplary embodiments of the invention may allow an individual shopping mall to be part of the mall as in online shopping malls such as auction or G-market. (B2B business model)

Although a few exemplary embodiments of the present invention have been shown and described, the present invention is not limited to the described exemplary embodiments. Instead, it would be appreciated by those skilled in the art that changes may be made to these exemplary embodiments without departing from the principles and spirit of the invention, the scope of which is defined by the claims and their equivalents.

What is claimed is:

1. An on-line sales method comprising:
providing a website operated by at least one computer connected to the Internet;
receiving, on the website, a user's submission of an amount for conducting a sales transaction;
providing, on the website, a plurality of items available for the user to select from and to potentially purchase at the submitted amount, wherein each of the plurality of items is pre-classified at one of a plurality of ranks;
providing a selection option of the user determined based on the submitted amount such that the larger the submitted amount, the more items at higher ranks the user can select from the plurality of items provided for selection;
receiving, on the website, the user's selection of multiple ones among the plurality of items in accordance with the user's selection option;
conducting a computerized lottery to select one out of the multiple items selected by the user, wherein the drawn item has a published price that is equal to or higher than the submitted amount; and
processing to check out the lottery-selected item at the submitted amount without regard to the published price of the lottery-selected item.

2. The method of claim 1, wherein the user's selection option is configured to restrict selection of the user.

3. The method of claim 1, wherein the user's selection option comprises a count of items to select from the plurality of items provided for selection, wherein the higher the submitted amount, the higher the count of items to select from.

4. The method of claim 1, wherein the user's selection option is determined such that the larger the submitted amount, the more expensive items the user can select from the plurality of items provided for selection.

5. The method of claim 1, wherein the plurality of items are presented in two or more groups of items, wherein the user is allowed to select one of the two or more groups, and to further select the multiple items within the selected group.

6. The method of claim 1, wherein the plurality of items are presented in two or more groups of items, wherein the user's selection option comprises a restriction to at least one of the two or more groups for selection.

7. The method of claim 1, wherein the plurality of items are presented in two or more groups of items, wherein given the submitted amount, the user's selection option varies in different groups.

8. The method of claim 1, wherein the plurality of items are presented in two or more groups of items, wherein the user's selection option comprises a first number of items to select in a first group whereas the user's selection option comprises a second number of items to select in a second group, wherein the first number differs from the second number.

9. The method of claim 1, wherein the website publishes prices of the plurality of items provided for selection.

10. The method of claim 1, wherein the user's submission of an amount comprises choosing one of a plurality of amounts that are proposed by the website.

11. The method of claim 1, further comprising: receiving a prepayment of money from the user that is to be used to pay for the submitted amount.

12. The method of claim 1, further comprising: receiving electronic payment of money from the user that is to be used to pay for the submitted amount.

13. The method of claim 1, wherein all or part of the prices of the plurality of items are equal to or higher than the submitted amount.

14. The method of claim 1, wherein the computerized lottery uses a predetermined selection algorithm, which assigns a probability value to each of the multiple items selected from the user.

15. The method of claim 14, wherein the probability value of an item is assigned based on at least loyalty of the user to the website.

16. The method of claim 1, wherein the lottery-selected item is selected from the group consisting of a single product, a bundle of products and a service.

17. A method of purchasing an item from an on-line store, the method comprising:
submitting, on a website, a user's willing amount for conducting a purchase transaction;
viewing, on the website, a plurality of items available for the user to select from in accordance with a selection option determined based on the submitted amount, wherein each of the plurality of items is pre-classified at one of a plurality of ranks, wherein the user's selection option is determined such that the larger the submitted amount, the more items at higher ranks the user can select from the plurality of items provided for selection;
selecting, among the plurality of items, multiple ones in accordance with the selection option, for a computerized lottery for further selecting one out of the multiple items;
receiving a result of the computerized lottery, the result comprising identification of an item selected in the computerized lottery, wherein the selected item has a published price that is equal to or higher than the submitted amount; and
processing to check out the lottery-selected item at the submitted amount without regard to the published price of the lottery-selected item.

18. The method of claim 17, wherein the selection option is configured to restrict selection of the user.

19. The method of claim 17, wherein the plurality of items are presented in two or more groups of items, wherein the user's selection option comprises a restriction to at least one of the two or more groups for selection.

* * * * *